Aug. 30, 1938.   C. E. BETZ ET AL   2,128,228
METHOD OF TESTING
Filed June 8, 1936   2 Sheets-Sheet 1
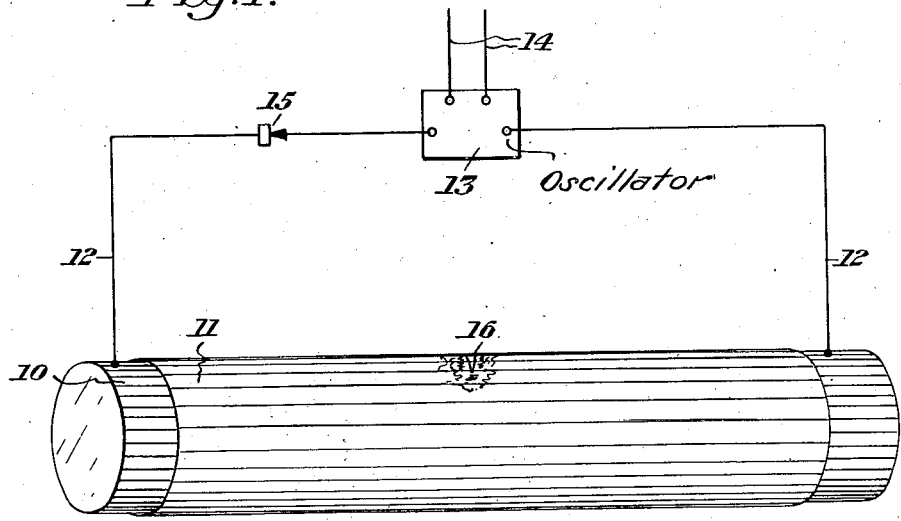
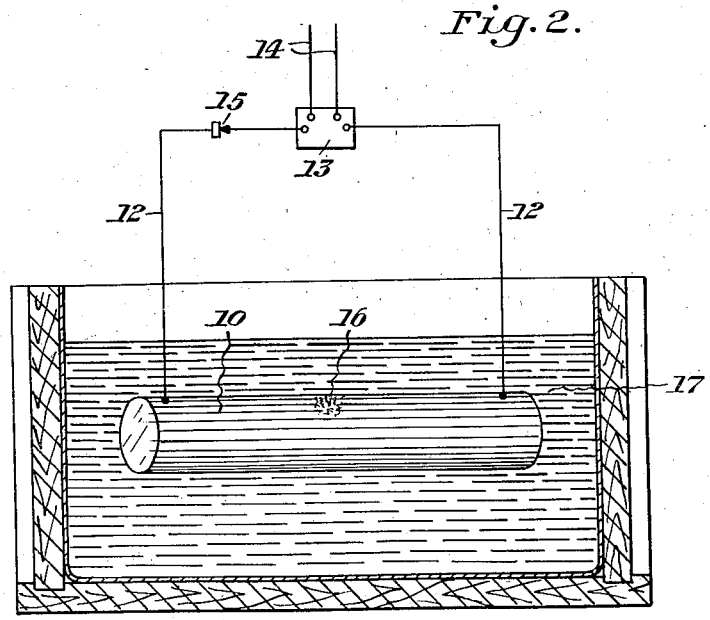
INVENTORS
Carl E. Betz &
Foster B. Doane
by their attorneys
Stebbins Blenko & Parmelee

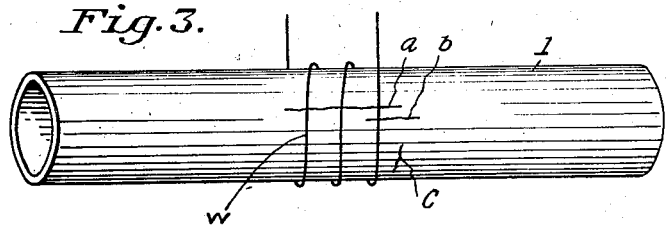
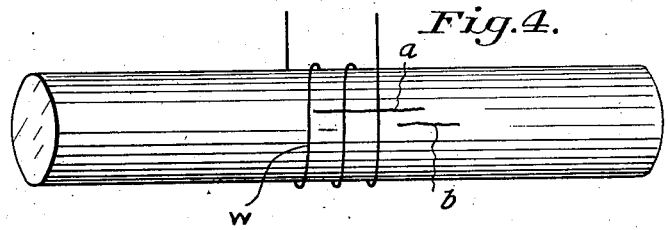
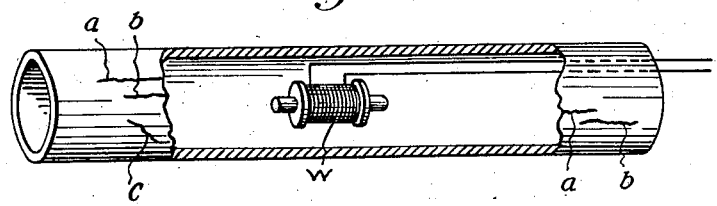
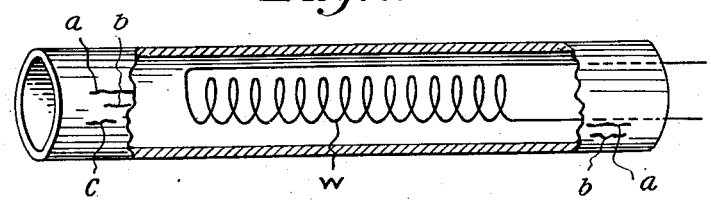

Patented Aug. 30, 1938

2,128,228

UNITED STATES PATENT OFFICE 2,128,228

METHOD OF TESTING

Carl E. Betz and Foster B. Doane, Chicago, Ill., assignors to Magnaflux Corporation, Chicago, Ill., a corporation of Pennsylvania Application June 8, 1936, Serial No. 84,176

15 Claims. (Cl. 175—183)

This invention relates to a method of testing and, in particular, to the testing of articles composed of electrically conducting material, to locate cracks, checks or other sharp discontinuities or sudden changes in structure at or near the surface of such articles.

It has been proposed heretofore to locate cracks or other defects in various types of articles by the use of electrical or magnetic fields, but the results obtained from these methods are often difficult to interpret. It has also been proposed to apply finely divided magnetic particles to a magnetized object, but this method of testing is limited to articles of magnetic material.

We have invented a method for testing articles composed of metal or other conducting material which provides a readily observable test indication and is applicable to all metal articles, whether magnetic or not. In accordance with our invention, we surround the article to be tested with an electrolyte. A periodically varying electric current is caused to traverse the article, the frequency of variation being such that the current is concentrated in the outer layers of the article by the so-called "skin effect". This phenomenon is well known and is proportional to the frequency of variation of the current. If the frequency is of the proper value, the current traversing the article will tend to leave the latter and flow through the electrolyte at points adjacent defects such as cracks and the like. This is because the resistance of the circuitous path around a defect such as a crack is greater than that of the direct path across the crack through the electrolyte. The passage of current through the electrolyte causes electrolysis, and visible indication thereof may be provided by incorporating a suitable indicator in the electrolyte.

For a complete understanding of the invention, reference should be had to the accompanying drawings and the following detailed description.

In the drawings,

Fig. 1 is a diagrammatic view illustrating one practice of the invention;

Fig. 2 is a similar view illustrating a modified practice;

Fig. 3 shows a further modification wherein the current is induced in the article under test;

Fig. 4 is a view similar to Fig. 3 illustrating the testing of slightly different type of article;

Fig. 5 shows a similar method except that it is practiced with a different type of inducing coil;

Fig. 6 illustrates a further modified method of testing hollow article; and

Fig. 7 illustrates a still further modification.

Referring first to Fig. 1, a test specimen 10, such as a bar or shaft, has applied to it a thin layer 11 of an electrolyte. As an example, we find an electrolyte composed as follows satisfactory for the purpose of the invention: agaragar 2%, salt (sodium chloride) 2%, phenol sulphon phthalein 0.1% and water, balance. The layer 11 may be applied by dipping the article in the electrolyte or by spraying, brushing or the like.

By means of connections 12, we cause electric current which is periodically varying in character to traverse the bar 10. The connections 12, for example, may extend to an oscillator 13 of known construction supplied with energy from any convenient source (not shown) through a supply line 14. While the invention may be practiced with either alternating current or pulsating direct current, we prefer the latter and therefore insert a rectifier 15 in one of the connections 12. The oscillator 13 is preferably designed to produce variable frequency alternating current, for example, up to 50,000 cycles per second or higher. The oscillating current may be amplified if desired before delivery to the test bar. The rectifier should not filter the pulsations nor smooth out the wave form, but simply provide pulsating direct current.

If the frequency of the current delivered to the bar 10 is low, the distribution of the current through the section of the bar will be substantially uniform. With increase in the frequency, however, the current is concentrated in the outer layers of the bar due to the skin effect. If the frequency is increased sufficiently, the current traversing the surface layers of the article will tend to pass through the electrolyte at points adjacent defects such as a crack 16, instead of taking the circuitous path around the crack. The flow of current through the electrolyte causes electrolysis of the latter, and this may readily be made visible. With the electrolyte mentioned above, electrolysis is revealed by the appearance of an intense blue color on the surface of the article on one side of the crack, changing sharply to red at the defect itself. This coloration is produced by the formation of alkali and acid respectively by decomposition of the sodium chloride in the electrolyte and the reaction thereof with the phenol sulphon phthalein indicator.

If alternating (unrectified) current is used the effect will be rather less sharp and there will be no line of demarkation between red and blue at the defect, which will, however, be located by the intensity of the color formed at that point. Other reactions are suitable for use with alternating current, particularly non-reversible reactions, such as the decomposition of an organic dye by the products of electrolysis of the electrolyte. It is expressly understood, however, that the invention is not limited in scope to any particular reaction or type of reaction, or to a reaction solely within the electrolyte, as the surface of the conducting medium itself may in some cases enter into the reaction.

The magnitude of the test current is not critical and need be sufficient only to produce the desired electrolytic effect, but will depend somewhat on the surface area of the test specimen. The frequency at which the effect is produced depends on the size and shape of the article.

Even stronger indications than are rendered visible in ordinary light may show up under photographic examination, when viewed in ultraviolet or infra-red light, or with the aid of the X-ray or a fluorscopic screen.

Fig. 2 illustrates a modified practice of the invention in which certain parts are designated by the same reference numerals as in Fig. 1. The distinctive feature of the practice illustrated in Fig. 2 is the electrolytic bath 17 in which the specimen 10 is immersed during the test.

Referring to Fig. 3 there is shown a pipe having a compact winding "W" therearound but insulated from the pipe movable therealong. Through this winding periodically varying electric current is passed by connecting it to any convenient source. Such currents flowing in the winding induce currents in the tube I which flow circumferentially around the tube and in a manner such as to set up potential difference on opposite sides of any metallic discontinuity such as the cracks a, b, c. When an electrolyte is present in the region of this discontinuity as a result of dipping or otherwise coating the pipe with it, the current tends to flow through the electrolyte in the manner heretofore described and causes a chemical change which may be detected visually. The pipe itself constitutes a closed secondary winding of a coreless transformer or a transformer with an air core, the winding "W" constituting the primary winding.

In Fig. 4 the same principle is applied except that a solid bar is being inspected instead of a tube. Due to the skin effect of the variable current it makes little difference whether the section be hollow or solid. It is sometimes an advantage to place a core in the tube which may overhang the winding at each end. This device has the effect of intensifying the field.

In Fig. 5 the same principle is employed except that the winding is spread out over the entire area which it is desired to test. This we term an extended winding in contrast to the compact winding of Figs. 3 and 4.

The winding may also be arranged on a spool in the case of tubes and the spool may or may not have a core, as shown in Figs. 6 and 7. The principle is the same in this case as in former cases except that the winding is inside the tube or hollow object instead of on the outside. The secondary of the transformer in this case being on the outside. In these last two cases, of course, the indication would be confined to the inside wall of the object and if it were not convenient to inspect the inner wall in order to detect indications it would be possible to photograph them or use an X-ray.

It will be apparent from the foregoing description that the invention provides a simple and easily practiced method of locating defects in metallic articles, without limitation as to the magnetic or other character of the article so long as it is composed of material which is an electrical conductor.

While we have specifically disclosed herein only one electrolyte, it should be understood that other electrolytes may be employed as well. The electrolyte may be a liquid or a gel, and of any suitable or desired composition.

Although we have illustrated and described herein but one preferred and one modified practice of the invention, changes in the procedure disclosed may be made without departing from the spirit of the invention or the scope of the appended claims.

We claim:

1. In a method of testing articles composed of electrically conducting material, the steps including surrounding the article with an electrolyte containing a color indicator, and causing periodically varying current of relatively high frequency to traverse the article.

2. The method defined by claim 1 characterized by the article being coated with said electrolyte.

3. The method defined by claim 1 characterized by the article being immersed in said electrolyte.

4. In a method of testing articles composed of electrically conducting material, the steps including surrounding the article with an electrolyte containing a color indicator, causing periodically varying current of relatively high frequency to traverse the article, and inspecting the article for change of color of said indicator caused by the passage of current through said electrolyte.

5. In a method of testing articles composed of electrically conducting material, the steps including comparing the resistance offered to the flow of electric current through the surface layers of the article, with the resistance offered to the flow of current through an electrolyte containing a color indicator covering the surface of the article.

6. In a method of testing articles composed of electrically conducting material, the steps including surrounding the article with an electrolyte containing a color indicator, causing periodically varying current of relatively high frequency to traverse the article, and increasing the frequency of said current to cause current to traverse the electrolyte adjacent defects.

7. In a method of testing articles composed of electrically conducting material, the steps including surrounding the article with an electrolyte having a resistance greater than that of said material and containing a color indicator, and passing periodically varying current through said article.

8. In a method of testing articles composed of electrically conducting material, the steps including surrounding the article with a conducting medium having a higher resistance than said material and containing a color indicator, passing current through the article, utilizing the skin effect to concentrate said current in the outer layers of the article and electrolyze said conducting medium in the neighborhood of defects.

9. In a method of testing articles composed of electrically conducting material, the steps including passing an electric current of varying frequency through the article and observing evidence of electrolysis when an electrolyte containing a color indicator is applied to the surface of the article.

10. In a method of testing electrically conducting articles, the steps including applying a coating of electrolyte containing a color indicator to the article and inducing a periodically varying electric current therein.

11. In a method of testing electrically conducting articles, the steps including applying a coating of electrolyte containing a color indicator to the article and passing it through a periodically varying magnetic field.

12. In a method of testing electrically conducting articles, the steps including applying a coating of electrolyte containing a color indicator to the article, disposing an inducing coil in inductive relation thereto, and causing relative movement between the coil and the article.

13. In a method of testing hollow articles of electrically conducting material, the steps including applying a coating of electrolyte containing a color indicator to the article and inserting an inducing coil within the article.

14. The method defined by claim 13 characterized by providing a magnetic core for said coil.

15. A method of testing articles composed of electric current conducting material, including providing an electrolyte containing a color indicator as a conductive path of higher resistance adjacent the article to be tested, passing an electric current through said article, and noting the place of color change if any where said current flows through the electrolyte.

CARL E. BETZ.
FOSTER B. DOANE.